April 22, 1941. G. F. KUEHN 2,239,043
GENERATOR
Filed Dec. 22, 1938 2 Sheets-Sheet 1
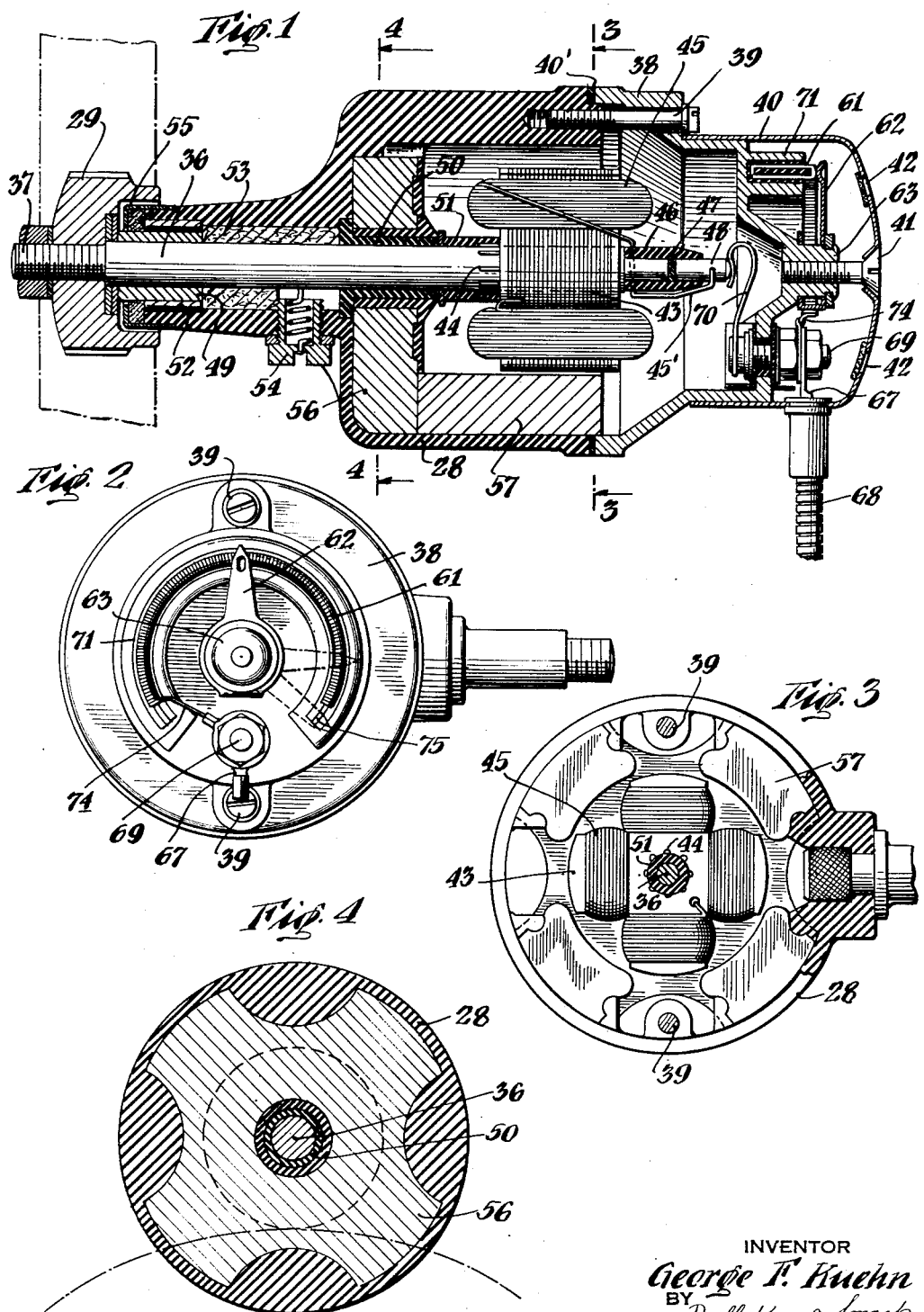
INVENTOR
George F. Kuehn
BY Duell, Kane & Smoot
ATTORNEYS April 22, 1941.  G. F. KUEHN  2,239,043
GENERATOR
Filed Dec. 22, 1938    2 Sheets-Sheet 2
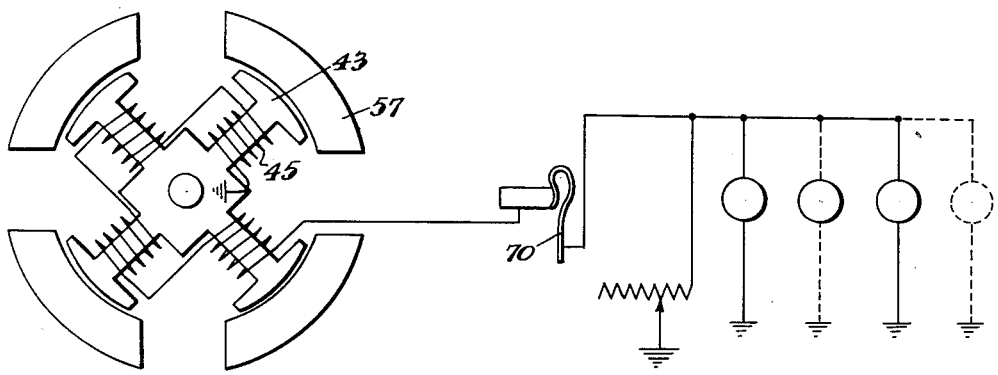
Fig. 5.
Fig. 6.
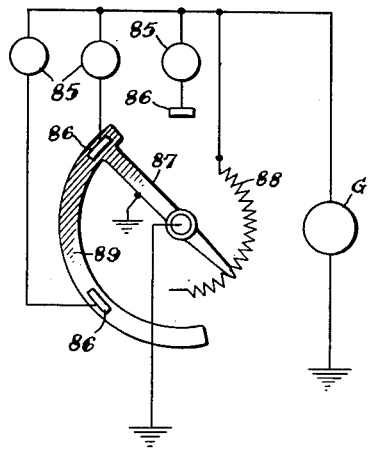
Fig. 7.
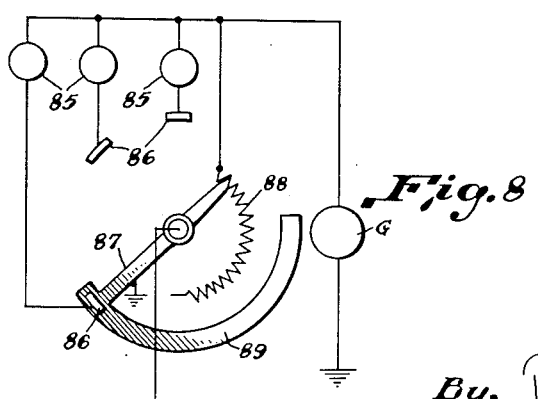
Fig. 8
Inventor,
George F. Kuehn
By, Duell, Kane and Smoot
Attorneys.

Patented Apr. 22, 1941

2,239,043

UNITED STATES PATENT OFFICE 2,239,043

GENERATOR

George F. Kuehn, Jackson Heights, N. Y., assignor to E. A. Laboratories, Inc., Brooklyn, N. Y., a corporation of New York Application December 22, 1938, Serial No. 247,170

3 Claims. (Cl. 171—252)

This invention relates to a structurally and functionally improved generator capable of use in numerous different associations but primarily intended to be employed where a generator of small size but capable of a relatively high output, is necessary.

An object of the invention is that of furnishing a unit of this character which may be manufactured by quantity production methods, and in which for example merely by the substitution of a single element in the generator assembly, units of widely differing capacities may be produced. Accordingly, the device may be manufactured for a nominal figure in that it will not be necessary to furnish different and complete sets of tool equipment for each size of unit which is to be produced.

A further object is that of providing a generator embodying a construction such that it will have a capacity capable of supplying current of a given value, or current of a much higher value, according to the desire of the user, and the construction of which unit will be such, that a relatively unskilled person may with facility, adjust the output of the unit according to the load which it is to assume, and so that the consuming elements coupled to the unit will operate with maximum efficiency and will not be subjected to excess voltages which would result in their injury.

A still further object is that of constructing a unit of this type which will function efficiently even although it is operated over a great range of speed. This is of especial value where a generator is, for example, utilized to be driven by being operatively coupled to one of the driving elements of a vehicle such as an automobile or bicycle. Especially in the latter connection, it will be understood that operating conditions may vary from two to twenty miles an hour, or even higher, and the generator might be employed to operate lights, signaling units, or other elements, throughout this range of speed. At the same time and due to the teachings of the present invention, the generator will not be injured due to this wide operating range, nor will it overheat.

Another object is that of providing a generator which would embody relatively few parts, each individually simple and rugged in construction, these parts operating over long periods of time with freedom from all difficulties.

With these and other objects in mind, reference is had to the attached sheets of drawings illustrating practical embodiments of the invention, and in which:

Fig. 1 is a sectional side view taken through a unit;

Fig. 2 is an end view of the same;

Figs. 3 and 4 are transverse sectional views taken along the lines 3—3 and 4—4 respectively and in the direction of the arrows as indicated in Fig. 1;

Fig. 5 is a diagrammatic view showing the coupling of the generator to an output circuit;

Figs. 6, 7 and 8 illustrate a wiring diagram which may be employed in connection with a slightly modified form of apparatus.

In the annexed drawings and the following description, it will be observed that the invention has been shown as a unit to be employed in connection with wheeled vehicles and especially bicycles. While in many respects the present unit is of primary value when employed in this connection, it is to be understood that except where the invention is limited to this particular combination in the appended claims, the disclosure is to be taken in an illustrative rather than in a specific sense, and in that—as will be obvious—the invention may be employed to advantage in numerous different other associations.

Thus, referring to the structure of the generator, attention is primarily invited to Figs. 1-4, in which it is to be understood that housing 28 is preferably formed of a die-cast material and that the driving wheel or pulley 29 may be formed of any suitable material and secured to the generator shaft 36 in any suitable manner as, for example, by a thread and nut structure 37. Also, it will be observed that the housing may be continued in the form of a rear or lower portion 38, again preferably formed of diecast material, and which is coupled to the main portion of the housing as, for example, by bolts 39. Additionally, if desired, a gasket or packing 40' may be interposed between the sections of the housing so as to exclude all foreign substances and moisture. Moreover, there may be applied to the end of portion 38 of the housing, a cap 40 formed of any desired material and secured in position as, for example, by bolt 41. This cap may present screened openings 42 through which air may circulate within the cap, and to prevent the parts reaching an excessive temperature.

Shaft 36 is preferably formed of soft iron or steel, and mounted upon the same is the armature core consisting of a group of magnetic lamina 43 arranged in the form of a Maltese cross. Preferably, movement between this armature portion and the shaft is prevented by knurling the shaft or forming the same with a plurality of splines 44, and then fitting the elements 43 tightly upon the shaft. This may be achieved, for example, by providing a drive fit at this point. Generating coils 45 are mounted upon the armature structure and are wound in series connection with the core legs in a manner such as to form alternate north and south poles. The beginning of the winding is grounded to shaft 36 as, for example, by providing a soldered connection at this point, and the opposite end 45' of the winding is extended towards the end of the shaft. At this point, the latter may mount a sleeve 46 which extends beyond the shaft end and encloses an insulating disc 47 of fiber or any other suitable material. Sleeve 46 provides a recess such that a conducting brush or element 48 of carbon, or other suitable material, may be mounted at this point, and the end of the winding 45' is electrically connected to this brush as, for example, by soldering.

With a view to properly supporting shaft 36, a front bearing 49 and rear bearing 50 are provided. The latter bearing is inserted in the forming die at the time of the die-casting operation and thus, in effect, is integral with housing 28. A collar 51 of bronze, or other suitable material, may enclose shaft 36 at a point adjacent bearing 50 and functions as a thrust bearing to prevent any displacement of the armature with respect to the housing. Bearing 49 may be furnished with a series of channels or grooves accommodating wicks 52 and inwardly of this bearing the housing provides sufficient space to furnish an oil or lubricant reservoir which may be filled with a mass of fibrous material 53. Access to this space may be provided by a filler plug or cap 54, which is threaded into an opening in the housing. It is apparent that lubricant introduced into this space will effectively reach the bearings, and by means of the wicks 52, or their equivalents, will be distributed to the thrust bearing surfaces adjacent the driving pulley 29. It will, of course, be understood that at this point certain sealing layers, caps and/or discs 55 may be furnished to prevent the entrance of foreign substances. No real problem of the lubricant escaping at this end of the generator will be present because the latter is usually inclined upwardly or else disposed in a substantially perpendicular position. Should, however, another form of mounting be resorted to, it is apparent that suitable packings (not shown) might be furnished at this point.

Now referring to the magnet, it is primarily to be understood that the latter is formed of a material having a high coercive characteristic and so constituted that die-casting heat up to 900° F. to 1,000° F. has not the slightest detrimental effect upon its properties. The material which is contemplated is known under various trade names and the various products differ from each other in minor respects. In Great Britain the metal is known as "Nipermag", while in the United States a functionally corresponding product is distributed under the trade mark "Alinco." The coercive force (H) of this metal varies between 400 and 600 gilberts per cm. and the remanence (B) between 5 and 6 kilogausses. To those skilled in the art, it is evident that by employing such a material, quite revolutionary changes in the design of all types of electrodynamic appliances are possible.

Thus, the material in question is used in the form of a Maltese cross and the body 56 of the same has associated with it poles 57 preferably formed of soft iron. The magnet and the poles are loaded into the die 58 as shown in Fig. 7, and it will be understood that the magnet structure has, prior to its disposition in the die, associated with it the bearing 50. The die is so constructed that this assembly may be disposed therein with great accuracy and with minimum effort, and then, as illustrated, the parts are retained in the die and in proper relation to each other, preferably under pressure conditions such that the assembly in effect becomes an integral part of the die-casting. By such procedure the joint between the magnet and poles is practically solid and, therefore, any magnetic reluctance is substantially eliminated. Also, by such procedure, it becomes unnecessary to spot-weld or otherwise connect the parts of the magnet. This is especially desirable having in mind that welding tends to destroy the magnetic properties of the elements, and that these elements are too hard to drill so that no coupling could be furnished by such a procedure. It is also to be understood that while only four pole pieces have been shown in the drawings, that the magnet might include any desired number of arms.

Accordingly, the main portion of the housing is produced and this part is now brought into association with a source of direct current. To effectively magnetize the generator, it is only necessary to close and open the controlling switch for the source, two or three times in rapid succession; the whole process being successfully accomplished in approximately five seconds.

It will also be observed that the section 38 of the housing provides upon its outer face a mounting for a resistor. This mounting may take various forms, but preferably embraces a groove within which the body of the resistor 61 may be partially disposed. The windings of the resistor are traversed by a contact arm 62 swingingly mounted upon a boss 63 forming a part of section 38, such arm being normally maintained against movement with respect to the boss. A lead 67 is preferably encased in an armored tube 68 extending through cap 40, and this lead may be secured to a terminal 69. The terminal mounts a spring 70 in engagement with brush 48. The resistor 61 is insulated from section 38 as has been indicated at 71. The arm 62 is, of course, grounded on boss 63. The end of the resistor winding is coupled as at 74 with terminal 69. Thus it follows that if the arm 62 is in the position shown in full lines, the current output is regulated to light to full brilliance (6.5 volts) one 0.4a. 6–8 v. lamp at a bicycle speed of 15 miles per hour, or a generator speed of approximately 4500 R. P. M. In this position, current is shunted through the resistor at approximately 10 ohms resistance. When the arm is in the position shown in dash and dot lines in Fig. 2 and with the same operating conditions, the output will light to full brilliancy two lamps. In this position current is shunted through the resistor at approximately 25 ohms resistance. When the resistance is cut out entirely, as shown in dash lines, the output is equivalent to the full capacity of the generator, (approximately 8 watts) and sufficient current is generated to light to full brilliancy three lamps of the type stated. The lamp load characteristics for lower speeds are such that maximum lamp light is assured.

Under ordinary circumstances, it would be found that without the voltage regulation made possible by employing the resistor, a current would be produced such that with a minimum number of consuming elements connected to the generator, the voltage (at ordinary generator speeds) would be excessive and destructive. However, by employing the resistor in shunt, this difficulty is avoided and even an inexperienced operator may remove cap 40 and adjust arm 62 to produce the results desired. In commercial production it may be helpful to definitely mark the three positions indicated, for example, in Fig. 2, and which might correspond to the setting of the parts where, for example, one, two, or three lamps respectively are to be continuously connected to the generator output.

In certain instances, it might be desired to provide a structure automatically compensating for the increases and decreases in load on the generator, and without relying upon any continuous manual adjustment such as is involved where arm 62 is shifted. If such a result is desired, this may readily be achieved by simply connecting the consuming elements 85 as shown in Figs. 6, 7 and 8, to the generator and having the opposite terminals 86 thereof capable of being engaged by a contact arm 87 which is grounded and traverses a resistor 88 which is arranged in shunt with the generator. The actual portion of the arm 87 engaging the contacts, may be in the form of an extension 89, and it is obvious as shown in Fig. 6, that with a control of this nature, all three of the consuming elements 85 may be energized under the full output of the generator, while if the parts are adjusted as shown in Fig. 7, one of the elements will be inoperative, but the resistor will have been cut-in to an extent such that excess voltages will not be produced, even although the generator is driven at high speeds. Finally, if the parts are adjusted as shown in Fig. 8, only a single element will be energized, but again the resistor will be correlated to prevent excess voltages occurring. Obviously, this method of control might be extended as desired, and in order to allow for the coupling of any desired number of consuming elements with the generator.

At the risk of repetition, it is desired to emphasize the fact that by the present construction there is entirely avoided the necessity of assembling and securing together the several parts of the magnet; these being retained as a unit integral with the die-cast material. In this manner all magnetic losses are avoided and also the expense of coupling the several parts to each other is eliminated. It is to be understood in connection with the generator shown, that no resistor is necessary where a fixed and predetermined load is present. Such a structure is only required where flexibility of output is to be allowed for.

Thus among others the several objects of the invention as specifically aforenoted are achieved. Obviously, numerous changes in construction and variations in the steps of the method of procedure, might be resorted to without departing from the spirit of the invention as defined by the claims.

Having described my invention, what I claim as new and desire to secure by Letters Patent is:

1. A generator including in combination a housing, a fixed magnet mounted within the same, an armature rotatably mounted within said housing and within the field of said magnet, lead wires extending from said armature to form electrical connection therewith and adapted to be connected to a current consuming element, an actuating wheel positioned at one end of said housing and coupled to said armature, a reduced portion forming part of said housing and positioned at the end opposite said actuating wheel, a resistance element mounted on said reduced portion in a circular position and parallel to the axis of rotation of said armature and a contact member for cooperation with said resistance element and forming electrical connection therewith, said resistance element and contact member being electrically coupled in series with one of said lead wires from said armature.

2. A generator including in combination a housing, a fixed magnet mounted within the same, an armature rotatably mounted within said housing and within the field of said magnet, lead wires extending from said armature to form electrical connection therewith and adapted to be connected to a current consuming element, an actuating wheel positioned at one end of said housing and coupled to said armature, a reduced portion forming part of said housing and positioned at the end opposite said actuating wheel, a resistance element mounted on said reduced portion in a circular position and parallel to the axis of rotation of said armature, a contact member for cooperation with said resistance element and forming electrical connection therewith, said resistance element and contact member being electrically coupled in series with one of said lead wires from said armature and a closure member for positioning over the reduced portion associated with said housing and thus encasing said resistance element and contact member.

3. A generator including in combination a housing, a fixed magnet mounted within the same, an armature rotatably mounted within said housing and within the field of said magnet, lead wires extending from said armature to form electrical connection therewith and adapted to be connected to a current consuming element, an actuating wheel positioned at one end of said housing and coupled to said armature, a reduced portion forming part of said housing and positioned at the end opposite said actuating wheel, a resistance element mounted on said reduced portion in a circular position and parallel to the axis of rotation of said armature, a contact member for cooperation with said resistance element and forming electrical connection therewith, said resistance element and contact member being electrically coupled in series with one of said lead wires from said armature and a closure member for positioning over the reduced portion associated with said housing and thus encasing said resistance element and contact member, said closure being formed with ventilating apertures to provide for the free circulation of air about said resistance element.

GEORGE F. KUEHN.